United States Patent [19]
Unterberger

[11] 3,828,245
[45] Aug. 6, 1974

[54] METHOD OF MAPPING BEDDING INTERFACES IN A PERMAFROST ZONE OF AN EARTH FORMATION BY ELECTROMAGNETIC RADIATION

[75] Inventor: Robert R. Unterberger, Fullerton, Calif.

[73] Assignee: Chevron Research Company, San Francisco, Calif.

[22] Filed: Oct. 4, 1971

[21] Appl. No.: 186,377

Related U.S. Application Data

[63] Continuation of Ser. No. 626,085, March 27, 1967, abandoned.

[52] U.S. Cl. ..................................... 324/6, 324/4
[51] Int. Cl. ........................ G01v 3/12, G01v 3/16
[58] Field of Search .................................. 324/4, 6

[56] References Cited
UNITED STATES PATENTS

| | | | |
|---|---|---|---|
| 2,139,460 | 12/1938 | Potapenko | 324/6 X |
| 2,426,918 | 9/1047 | Barret | 324/6 |
| 2,657,380 | 10/1953 | Donaldson | 324/6 X |
| 2,659,882 | 11/1953 | Barret | 324/6 X |
| 3,286,163 | 11/1966 | Holser et al. | 324/6 |

OTHER PUBLICATIONS

Meyer, M. A., Remote Sensing of Ice and Snow Thickness, Report for U.S. Army Cold Regions Res. & Eng. Lab. pp. 183–192.

Barringer, A. R., Research Directed to the Determination of — And Ice Thickness by Pulsed VHF Propagation Methods, Final Report March, 1965, pp. i and 47.

Cook, John C., Proposed Monocycle–Pulse VHF Radar for Air–Borne Ice and Snow Measurement, AIEE November 1960, pp. 588–594.

Lundien, J. R., Terrain Analysis by Electromagnetic Means, Report 2 Technical Report No. 3–693, September, 1966, Army–MRC pp. 49–54.

Primary Examiner—Gerard R. Strecker
Attorney, Agent, or Firm—R. L. Freeland, Jr.; H. D. Messner

[57] ABSTRACT

A method for accurately and quickly mapping the location of bedding interfaces in the permafrost zone of an earth formation from a movable vehicle, say an aircraft, by transmitting electromagnetic radiation through the permafrost zone from a known geographic position on or above the permafrost's surface, detecting a portion of energy reflected from each bedding interface of the permafrost zone and recording the two-way travel time of the energy reflected from each of the bedding interfaces so as to indicate distance — and hence location — of each bedding interface with respect to the known location of the electromagnetic radiation system.

2 Claims, 7 Drawing Figures

PATENTED AUG 6 1974

INVENTOR
ROBERT R. UNTERBERGER
BY
ATTORNEYS

INVENTOR
ROBERT R. UNTERBERGER
ATTORNEYS

INVENTOR
ROBERT R. UNTERBERGER
BY *Ralph L. Freeland Jr.*
*Harold O. Messner*
ATTORNEYS

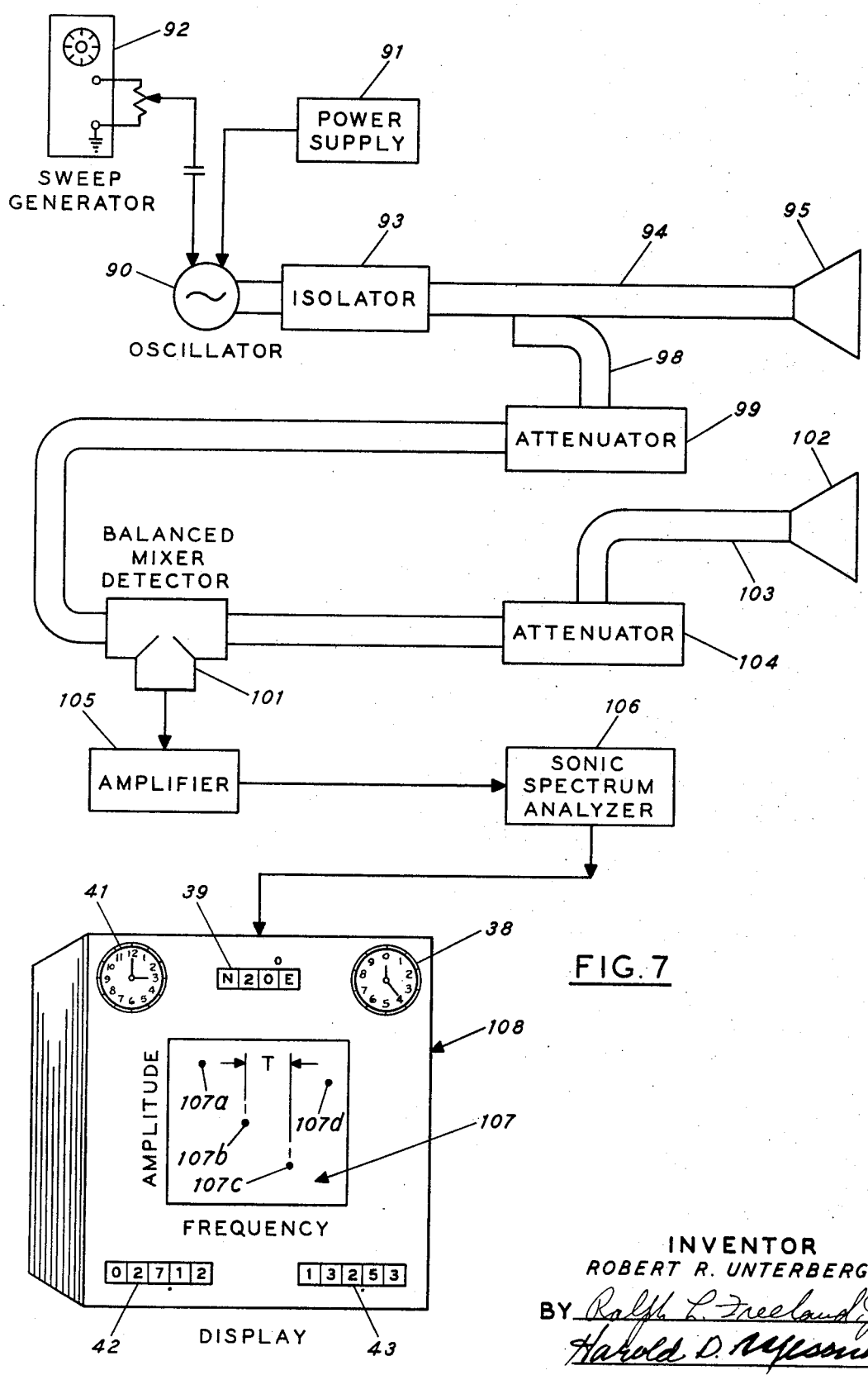

METHOD OF MAPPING BEDDING INTERFACES IN A PERMAFROST ZONE OF AN EARTH FORMATION BY ELECTROMAGNETIC RADIATION

This is a continuation of application Ser. No. 626,085, filed Mar. 27, 1967, now abandoned.

BACKGROUND OF THE INVENTION

The present invention relates to a method of mapping bedding interfaces in a permafrost zone of an earth formation. Permafrost regions are located in the more northerly and southerly extents of the world's vast land area and are defined as the perennially frozen layer of earth formation which remains below 0° C. for many years (Robers F. Black, "Permafrost — A Review," Bull. of G.S.A. 65,839).

More particularly, the present invention relates to a method for accurately and quickly mapping the location of bedding interfaces in the permafrost zone of an earth formation from a movable vehicle, say an aircraft, by transmitting electromagnetic radiation through the permafrost zone from a known geographic position on or above the permafrost's surface, detecting a portion of energy reflected from each bedding interface in the permafrost zone even where the dielectric constants of the adjacent beds are fairly closely matched, and recording the two-way travel time of the energy reflected from each of the bedding interfaces so as to indicate distance — and hence location — of each bedding interface with respect to the known location of the electromagnetic radiation system.

Most problems involved in conducting geological and geophysical surveys for oil in the perennially frozen land regions of the world such as Greenland, Canada, Alaska, Siberia, Spitsbergen and the Antarctic, are caused by the geographical and environmental conditions existing in these areas: (1) low temperatures, (2) ice and snow, (3) remoteness of these regions from centers of commercial activity, and (4) inaccessability of many mapping sites to usual modes of transportation so that rather slow-moving track vehicles may be the only means available to carry a survey crew and its equipment to the mapping site. Further difficulties arise because of the few months per year when it is possible to study geological items of interest in these areas such as rock outcrops, strike and dip, faults, etc.

SUMMARY

In a preferred form for carrying out the present invention, an electromagnetic generating and receiving means is located at a known but easily movable geographic position on or above a permafrost zone of an earth formation, say in an aircraft flying above the permafrost zone. The locations of interfaces of different rock formations comprising the permafrost zones are then determined by (1) irradiating, by means of an electromagnetic wave generating means, the permafrost zone with electromagnetic radiation, (2) detecting, by electromagnetic receiving means, a portion of the energy reflected from each bedding interface within the permafrost zone, and (3) recording the travel time of the energy as a function of the known geographic location of the electromagnetic generating and receiving means whereby the distance represented by the travel time of the energy within each bed in the permafrost zone can be displayed to provide a stratigraphic map of the permafrost zone.

The electromagnetic radiation in accordance with the present invention is desirably pulse modulated for periodic radiation from the electromagnetic radiation means. Accordingly, the location and identification of the various bedding layers within the permafrost zone can be determined by measuring the differences in time between the emitted pulse and the pulses reflected from the various beds. It should also be noted, however, that the radiation can also be continuous wave (CW) but frequency-modulated in such a way that the frequency of the electromagnetic generating means is varied above and below a preselected center frequency at a rate so that the frequency of the returning energy can be compared and thereafter interpreted in terms of distance to indicate the location of the bedding interfaces.

Desirably, the center frequency of the continuous wave electromagnetic radiation, or the carrier frequency of the pulse modulated radiation system is selected to optimize its transmission through the frozen structure comprising the permafrost zone. In this regard, a frequency range from about $10^6$ to $10^{11}$ Hertz has been found to be desirable.

While it has been proposed to use electromagnetic radiation for measuring the thickness of the ice caps in Greenland and in the Antarctic, the transmission of electromagnetic radiation from either aircraft or surface vehicles has not heretofore been used to identify and locate bedding interfaces of the permafrost zone of an earth formation.

Further objects and advantages of the present invention will be apparent from the following detailed description taken in conjunction with the accompanying drawings which form an integral part of this specification.

DESCRIPTION OF THE DRAWINGS

FIG. 7 illustrates in block form continuous wave but frequency modulated generating-receiving means also useful in the arrangement of FIG. 1.

DESCRIPTION OF PREFERRED EMBODIMENTS

Figure 1:
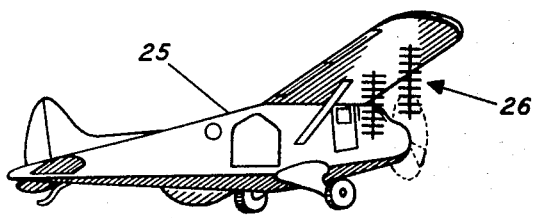
FIG. 1 is a schematic representation of the method of the present invention for mapping the bedding interfaces of a permafrost zone of an earth formation from a known geographic position above the permafrost zone.
Figure 1:
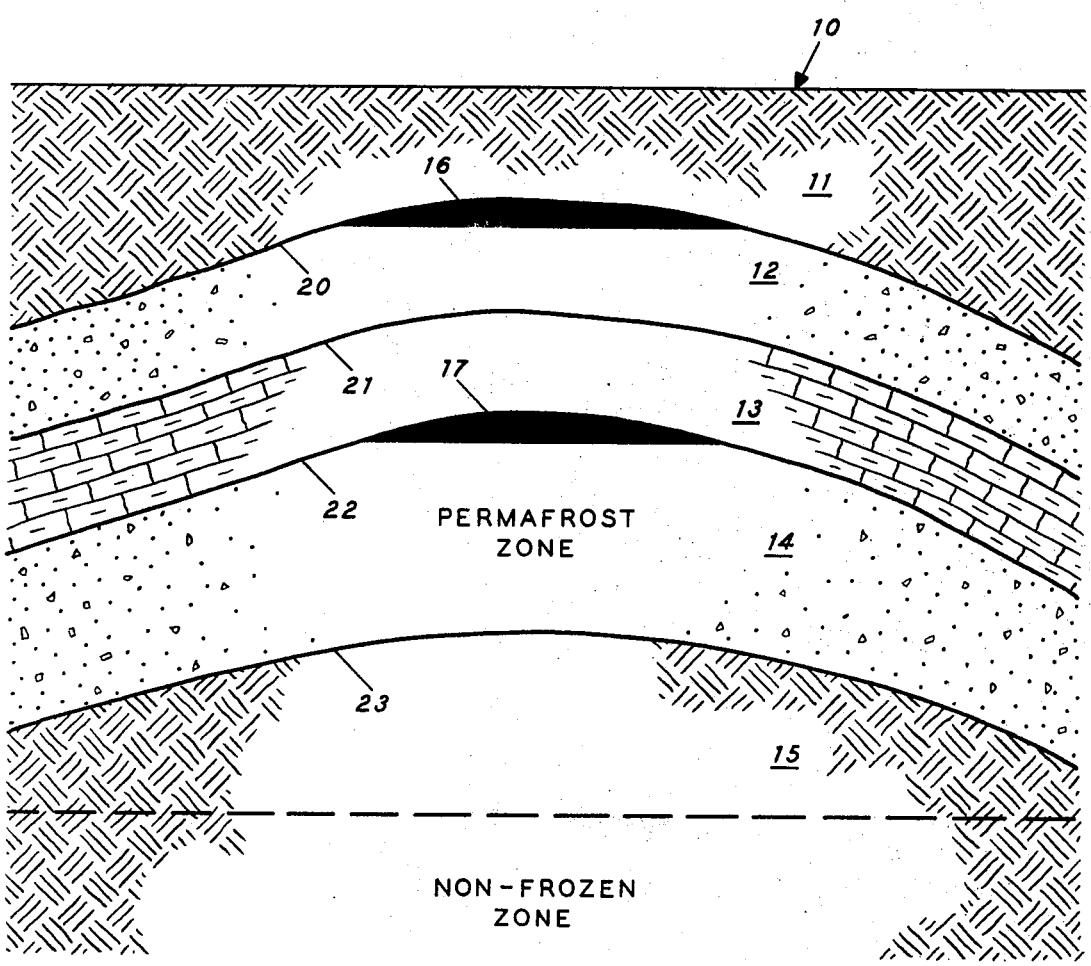

Referring now to the drawings and, more particularly, to FIG. 1, there is schematically indicated a method for the use of the present invention to map geological strata within a permafrost zone 10. The purpose of such mapping is to locate the depth of the interfaces of beds 11, 12, 13, 14 and 15 so that a true stratigraphic picture of the dip and strike of the bedding within the permafrost zones can be determined over a wide area and such information used to identify likely areas for accumulation of hydrocarbons in the permafrost zone itself or to infer the deeper geological structure of the nonfrozen zone below the permafrost where such accumulations could also occur.

Beds 11, 12, 13, 14 and 15 are not always parallel to the earth's surface but may change contour in a manner similar to conventional unfrozen earth formations. For example, these beds may be tilted relative to a central axis to form an anticline, as shown, after the beds had been initially laid down horizontally. The apex of beds 12 and 14, together with impermeable beds, such as 11 and 13, respectively, may form traps for accumulation of hydrocarbons as indicated by the reservoirs 16 and 17. Obviously, if the exact and true stratigraphic nature of the orientation of bedding within permafrost layer 10 is known, geological structure within the permafrost zone as well as in the nonfrozen zone below the permafrost, associated with the formation of oil deposits can be identified and their oil deposits, such as reservoirs 16 and 17, drilled and produced.

Bedding interfaces 20, 21, 22 and 23 within permafrost layer 10 are detected in accordance with the present invention by transmitting pulsed or frequency-modulated electromagnetic energy from a known position on or above the permafrost zone, as say from aircraft 25. After the energy is transmitted, say by means of antennas 26, a portion of energy is reflected from each of the bedding interfaces in the permafrost zone and this is received and detected by the same or separate antennas. By measuring the time between transmission and reception of the electromagnetic energy (by analysis of the outgoing and incoming pulses or by their differences in frequency in the FM system) the location, or depths, of the bedding interfaces in the permafrost zone can be indicated and displayed. A knowledge, of course, of the average dielectric constant of the frozen earth materials comprising the permafrost zone is required to interpret the travel time of the energy in terms of distance.

Figure 2:
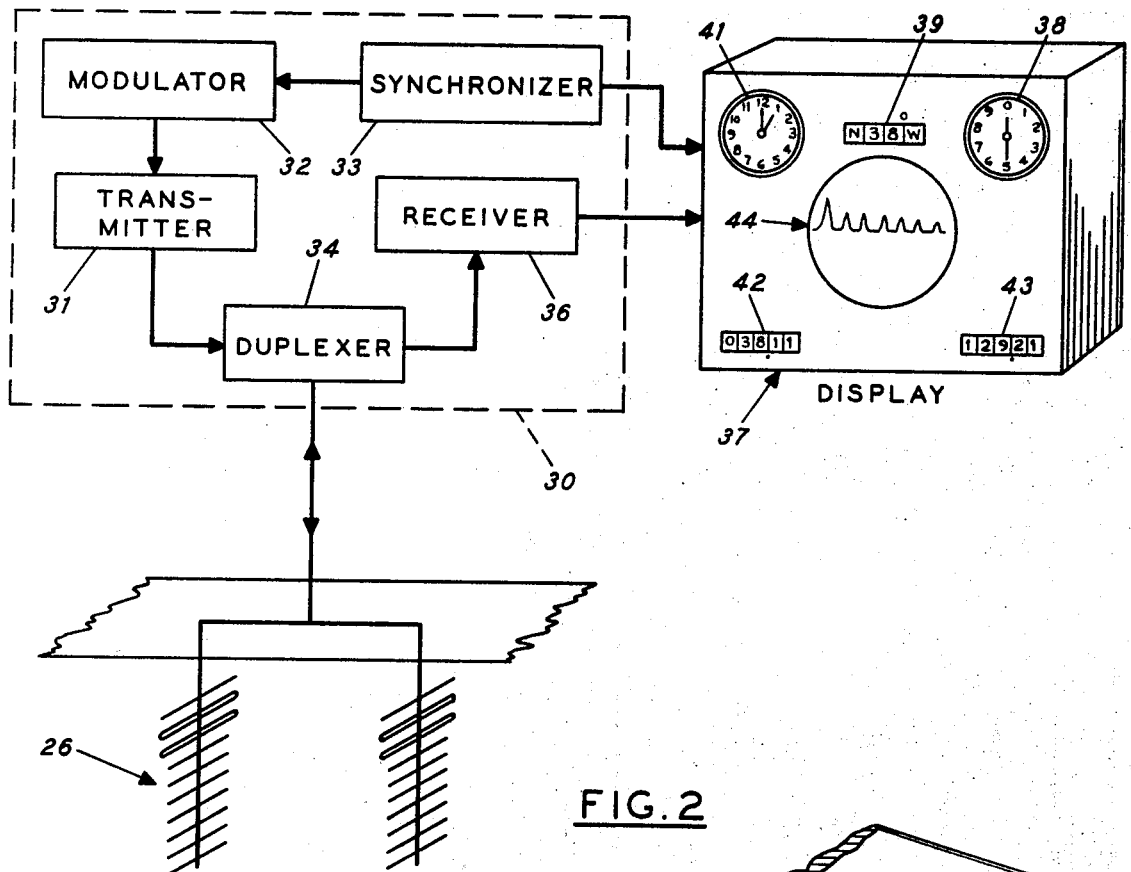
FIG. 2 illustrates in block diagram form the electromagnetic generating-receiving and display means useful in the arrangement of FIG. 1.

FIG. 2 illustrates electromagnetic transmitting and receiving circuit 30 for transmitting and receiving electromagnetic energy. Circuit 30 preferably includes a high-frequency radio transmitter 31 suitably controlled by modulator (pulser) 32 and synchronizing circuit 33. Connected to the output of transmitter 31 is duplexer 34 which suitably controls switching of antenna array 26 from the transmitter 31 to receiver 36. The output of synchronizing circuit 33 and receiver 36 connects to display unit 37 where an indication of the travel time of electromagnetic radiation can be displayed as a horizontal distance across the oscilloscope face and recorded in suitable fashion.

Figure 5:
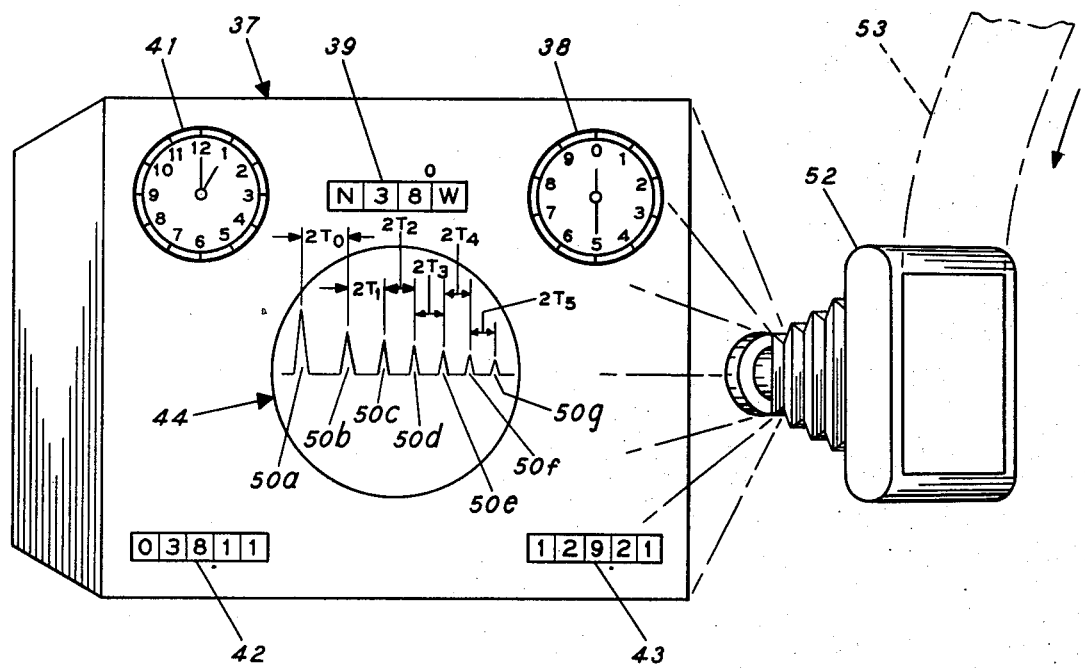
FIG. 5 illustrates in more detail the display system of the arrangement of FIG. 2.

FIG. 5 illustrates display unit 37. Display unit 37 includes several indicators: for altitude of the aircraft, 38; for compass heading of the aircraft, 39; for time, clock 41; for geographic location of the aircraft, indicators 42 and 43; and for the two-way travel time display of the electromagnetic radiation emission and return from the permafrost, oscilloscope 44. Altitude indicator 38 indicates the elevation of the aircraft above the surface of the permafrost and can be measured by a variety of instruments common to aircraft; for example, an altimeter as shown. As the location of the permafrost thickness must be related to a given land area, the geographic position of the aircraft must be known at all times. Provided for this purpose are distance indicators 42 and 43 which are part of an electronic position-locating system, such as Shoran, that digitally displays the distance to two known locations of Shoran transponders. From these display units, the position of the aircraft 25 can be determined. Compass indicator 39 also provides useful information during the mapping of the permafrost zone. Its information, for example, can be used to aid in establishing the instantaneous heading of the aircraft during the mapping operation in case of an interruption of signals from the Shoran transponders. In this regard, the compass heading of indicator 39 is permanently recorded upon each frame of moving picture film taken of the terrain immediately below the aircraft as the permafrost zone is being mapped. A clock (not shown) similar to clock 41 may also be superimposed upon each frame as a further aid in this regard. Thus, the second camera will show the actual type of terrain being flown over, such as rivers, frozen lakes, forests, etc. as a function of time to aid in the identification of the area for which electromagnetic reflections have been received and recorded.

In the present invention, the bedding interfaces in the permafrost zone are indicated by the two-way travel times ($2t_1$, $2t_2$, $2t_3$ and $2t_4$) of the reflected pulses as shown on scope 44. In this regard, it should be noted that the primary emission pulse is indicated at 50a. It is related to the distance of the aircraft above the permafrost's surface by relating its two-way travel time ($2t_0$) as indicated by the first reflected pulse 50b received at the aircraft with its rate of travel in air. Reflected pulses 50c, 50d, 50e and 50f have their origins in the permafrost zone where a change in the dielectric constants of adjacent bedding has occurred. Accordingly, these pulses indicate the location of the bedding interfaces in the permafrost zone. The remote contact, or bottom, of the permafrost zone is indicated by the last-received reflection, pulse 50g. In most cases, the porous water-wet formations in the unfrozen zone immediately below the permafrost zone are so lossy to electromagnetic wave propagation that no signals can be obtained below the remote contact of the permafrost except, say, where the nonfrozen zone (1) is composed of nonporous (tight) rock formations or (2) is porous but is filled with nonaqueous fluids such as hydrocarbons. By physically associating the indicators, the formation of all units can be simultaneously recorded as by a camera 52 using film 53 which travels across the lens of the camera 52 in the direction indicated. With the time of travel of each of these pulses along with their velocities in the various propagating media estimated from a knowledge of the probable lithology of the permafrost zone, the location, or depths, of each bedding interface within the permafrost zone can be determined and a two-dimensional map, i.e., a vertical near-surface section, constructed. Furthermore, the mapping area flown over by the aircraft 25 can be enlarged using known mapping techniques, such as having the aircraft fly in a grid pattern. Then, ultimately a three-dimensional map showing subsurface geological structure can be constructed.

Figure 6:
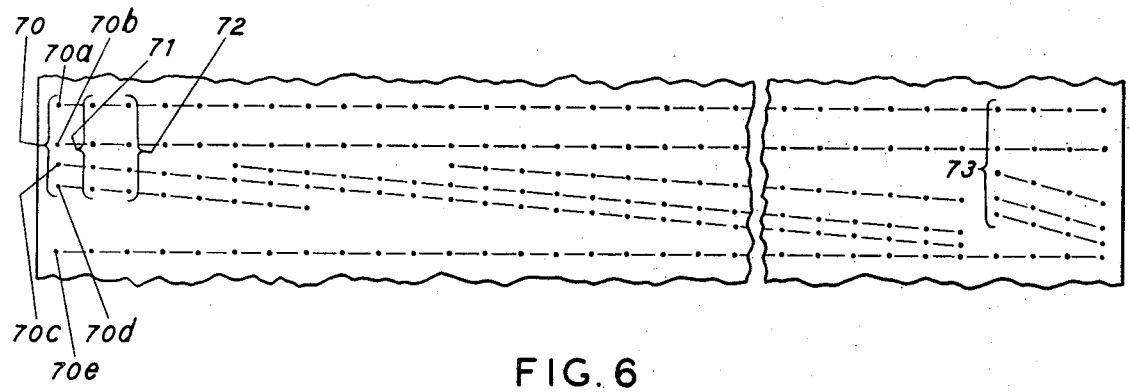
FIG. 6 is a plot of the electromagnetic signals received and recorded by the display system of FIG. 5 modified to provide z-axis threshold modulation of the signals.

FIG. 6 is a representation, on film, of the composite reflections of the electromagnetic signals provided by a modified display unit 37 as the aircraft travels along one profile of the permafrost zone 10. In this application, the oscilloscope has been connected to provide threshold, or z-axis, modulation by the emitted and reflected pulses so that the pulses appear as bright dots in the scope face. Time is the vertical axis or short dimension of the film. Each column of dots represnets a composite, or trace, of emitted and received pulses, such as traces 70, 71, 72, 73, which have occurred during the passage of one frame of film across the lens of the camera photographing the scope face. Furthermore, because time represents depth each trace also represents, in a manner explicitly determined by the change in dielectric constants of adjacent beds of the permafrost zone, the depth of the bedding interfaces over a given instantaneous profile of the permafrost zone even though the aircraft is continuously moving over the permafrost zone during the mapping operation. Accordingly, these traces provide a profile record of the permafrost zone to indicate its geological structure, such as sloping beds (traces 70, 71, 72), or faults (trace 73). Ultimately, phantom lines may be added to the record as shown in FIG. 6, to connect the traces to better illustrate the structural relief of the mapped region.

The location (depth) of the bedding interfaces within the mapped permafrost zone is determined by the two-way travel time of the pulses, as represented by the position of the dots of each trace on the scope face. For example, for trace 70 of FIG. 6, dot 70a represents the time of the emitted pulse; the two-way travel time between the dots 70c and 70d is indicated by the vertical distance between them on the scope face. To convert the travel time to distance so as to indicate the depth of the bedding interfaces involves, as previously explained, the use of the known or approximated velocity of the electromagnetic energy in the permafrost zone. In a similar manner, dot 70b represents the time of arrival of the initial reflection from the surface of the permafrost zone so as to provide a direct indication of the altitude of the aircraft 25 above the permafrost. Dot 70e represents the time of arrival of the reflection from the remote contact, or interface, of the frozen permafrost zone and the unfrozen zone so as to provide an indication of the thickness of the permafrost, as described in my copending application assigned to the assignee of the present application, "Method of Mapping Permafrost by Electromagnetic Radiation to Indicate Thickness Thereof," filed Oct. 24, 1972, Ser. No. 186,376, filed Mar. 27, 1967, now abandoned.

In carrying out the method of the present invention, the frequency of the electromagnetic radiation preferably is within a frequency range of $10^6$ to $10^{11}$ Hertz so as to propagate within the permafrost zone without undue attenuation of the signal and yet provide great near-range resolution. It has been found that surprisingly good resolution of the different bedding interfaces is obtained by the method of the present invention using electromagnetic energy in the aforesaid frequency range even though the dielectric constants of the different rock matrices are fairly closely matched. Table I sets forth dielectric properties of several pertinent earth materials which would be expected to comprise permafrost zones.

TABLE I

|  | Temp. | Dielectric Constant | Loss Tangent | Frequency, MHZ |
| --- | --- | --- | --- | --- |
| Ice | −12°C. | 3.2 | $9 \times 10^{-4}$ | 3 |
| Sandy Soil (dry) | 25°C. | 2.55 | $10^{-2}$ | 300 |
| Loamy Soil (dry) | 25°C. | 2.47 | $6.5 \times 10^{-3}$ | 300 |
| Clay Soil (dry) | 25°C. | 2.38 | $2 \times 10^{-2}$ | 300 |
| Magnetite Soil (dry) | 25°C. | 3.50 | $2 \times 10^{-2}$ | 300 |
| Fused Silica | 25°C. | 3.78 | $0.5 \times 10^{-4}$ | 300 |
| Cable Oil | 25°C. | 2.17 | $43 \times 10^{-4}$ | 300 |
| Porous Brea Sandstone (dry) | 25°C. | 3.0 | $7-10 \times 10^{-3}$ | 195, 380 |
| Porous Boise Sandstone (dry) | 25°C. | 2.95 | $6 \times 10^{-3}$ | 330, 410 |
| Porous Limestone (dry) | 25°C. | 6.0 | $8 \times 10^{-3}$ | 200, 400 |

Low attenuation of the electromagnetic waves in the permafrost zone is made possible by the fact that the water moleculs within the porous earth formations are frozen and therefore the electric dipole moment—the chief loss mechanism of electromagnetic wave transmission—cannot resopnd to the time-varying electric vector of the electromagnetic wave. It has been found that the method of the present invention oprates with maximum efficiency in the aforesaid frequency range to allow mapping of different bedding intervals in the permafrost zone even though the reflection coefficients at the bedding interfaces are relatively low.

Figure 4:
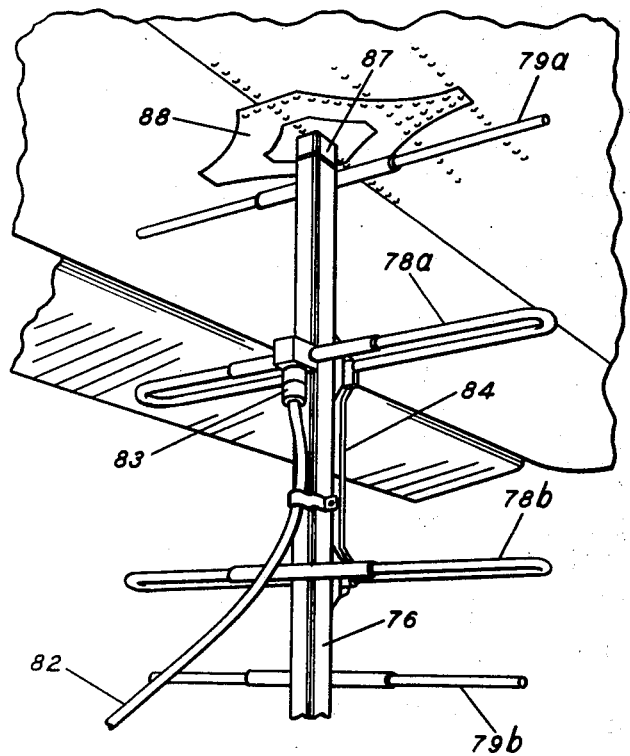
FIGS. 3 and 4 illustrate one form of the antenna system useful in the arrangement of FIG. 1 including a two-bay transmitting and receiving antenna array.
Figure 3:
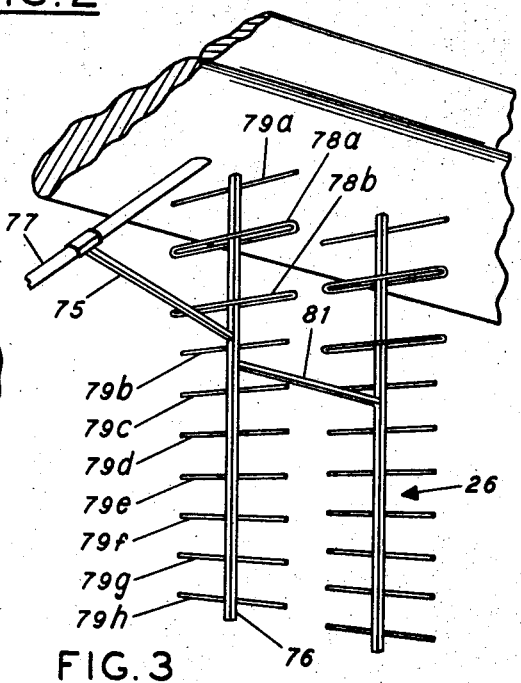

FIGS. 3 and 4 illustrate antenna array 26 useful with the system of the present invention. Referring to FIG. 3 the antenna array 26 is a Yagi array supported on te aircraft wing as by support stub 75, extending between mast 76 of one of the antennas and airplane strut 77. Preferably, each antenna includes active elements 78a and 78b, as well as a series of passive elements for directing the energy in a downwardly directed beam for penetrating the permafrost zone. The passive elements include a reflector element 79a located adjacent the wing of the aircraft and a series of director elements 79b – 79h extending along the mast 76 of each antenna. Between the antennas a transverse support 81 fixes the masts of the antennas in a parallel array. Passive elements 79a –79h, as well as active elements 78a and 78b, are preferably positioned so that their axes of symmetry are parallel to the line of flight of the aircraft. Accordingly, air resistance caused by the antenna array during the mapping operation is minimal.

As illustrated in FIG. 4, the active elements 78a of each antenna is electrically connected by coaxial line 82, connector 83 and parallel feed lines 84 to element 78b to the transmit-receive circuitry within the aircraft. Adjacent to the reflector element 79a, the near end of the mast 76 of each antenna is also seen to be supported in contact with the aircraft, as by an insulating sleeve 87 having a planar base 88 riveted to the wing of the aircraft. Where greater sensitivity and/or directivity is required, as when, for example, the beds of the interface are quite thick and/or attenuation of each bed is rather high, additional antennas may be added to the array along the wing of the aircraft to increase the gain of the antenna system. Additionally, the antenna array can be split into two separate arrays: a transmitting array and a receiving array for respective separate connection to the transmitter 31 and receiver 36 of the system of FIG. 2, thus eliminating the need for duplexer 34.

FIG. 7 illustrates in schematic diagram form, an alternate transmit-receive system for performing the method of the present invention utilizing continuous wave (CW) but frequency-modulated (FM) electromagnetic energy. In mapping the location of bedding interfaces in the permafrost zone, occasionally either the permafrost itself or one or more of the beds within the permafrost zone is relatively thin. It is proposed in such cases that a frequency modulation ranging system operative within the aforementioned frequency range be employed to measure these relatively small permafrost bedding thicknesses.

Referring again to FIG. 7, a continuous wave (CW) oscillator 90 is energized by power supply 91 to generate a basic frequency ($f_o$) for the radiating electromagnetic energy. Preferably, the basic frequency is equal to a frequency within the frequency range of $10^6$ to $10^{11}$ Hertz. The oscillator 90 may be a magnetron or klystron capable of operating at the desired frequencies of transmission and at a suitable power output. A sweep generator 92 is connected to the oscillator and generates a varying potential at a frequency ($f_m$), say from $10^6$ to $10^{11}$ Hertz, to cause, preferably, a linear time variation in the transmitted frequency about its center frequency ($f_o$). The output of the oscillator is supplied through an isolator 93 to a transmission line 94 carrying the electromagnetic energy to a transmitting antenna 95. Transmitting antenna 95 is preferably the directional type positioned on a movable vehicle or an aircraft and directed for penetration into the permafrost zone. Between isolator 93 and the transmitting antenna 95 is a directional coupler 98 for sampling the frequency of the oscillator 90. The sample signal is supplied through attenuator 99 to a balanced mixer-detector 101. In carrying out the invention in accordance with the present embodiment, receiving antenna 102 is located adjacent to transmitting antenna 95. It connects through transmission line 103 to an attenuator 104 and thence as a second input to balanced mixer-detector 101. At the balanced mixer 101, the outputs of attenuators 99 and 104 are mixed to develop a difference frequency. This difference frequency is fed to amplifier 105. A sonic spectrum analyzer 106 measures the amplitudes and frequencies of the difference signals from the balanced mixer-detector 101 and plots the information on a chart or record 107 within display unit 108. Chart 107 shows four reflected signals: the first, signal 107a, is at the lowest frequency of the system and represents the altitude of the aircraft above the permafrost zone; the second, signal 107b, and the third, signal 107c, respectively represent reflections from beds of different earth materials within the permafrost zone; and the fourth, signal 107d, represents the bottom of the permafrost zone. Note that the amplitude of the signal 107d is large because of the large change in dielectric constants at the ice-water interface characterisitic which occurs at the bottom of the permafrost zone composed of porous formations. The relation of the difference in frequency to the location of each bedding interface relative to the adjacent interface is found by the following equation:

Difference in frequency = rate of change of the changing frequency × time between the transmitter and the reflections received from one particular bedding interface $$\Delta f = R_f \times T$$

which can be written as:

$$\Delta f = \frac{B}{\frac{1}{2 f_m}} \times \frac{2d}{v}$$

where
- $f_m$ = Modulation rate
- $B$ = band width of the frequency modulation
- $d$ = distance from the transmitter to the particular interface of the permafrost zone, and
- $v$ = the velocity of transmission in the permafrost which, for measurement purposes, is equal to: $v = c/\sqrt{E'/E_o}$ where
- $c$ = speed of light in air
- $E'$ = the real part of the complex dielectric constant of the permafrost formation at the center frequency
- $E_o$ = the real part of the complex dielectric constant of free space By associating the two-way travel times presented by the frequuency differences of the emitted and reflected signals with the information present on remaining indicators of the display unit 108 such as altimeter 38, gyroscope 39, clock 41 and Shoran distance indicators 42 and 43 responding to signals from two slave Shoran stations at known locations, the location of each bedding interface within the permafrost zone can be mapped as a function of the geographic location of the aircraft. As previously described, a camera can be used to photograph the information contained on display unit 108.

While certain preferred embodiments of the invention have been specifically disclosed, it should be understood that the invention is not limited thereto as many variations will be readily apparent to those skilled in the art and the invention is to be given its broadest possible interpretation of the following claims. For example, an omnidirectional antenna might be utltilized in the method of the present invention if the reflected pulses from sources other than the bedding interfaces within the permafrost zone can be identified, or otherwise deleted as on the basis of signal intensity.

I claim:

1. Method of mapping bedding interfaces of different earth materials within a permafrost zone of an earth formation by means of an electromagnetic generating and receiving means located at a known geographical location adjacent to the upper surface of said permafrost zone, which comprises:
    a. irradiating said permafrost zone with electromagnetic energy within a frequency range of $10^6$ to $10^{11}$ Hertz by actuation of said electromagnetic generating and receiving means,
    b. detecting reflections of the electromagnetic energy from at least two interfaces within said permafrost zone, said interfaces forming electromagnetic discontinuities within said permafrost zone, said at least one interface being associated with the upper surface of said permafrost zone, said other interface being associated with the bottom of said permafrost zone, said reflections occurring because of different dielectric constants of said interfaces,
    c. also detecting reflections from electromagnetic discontinuities in a nonporous, nonfrozen zone immediately beneath said permafrost zone above a selected threshold value, d. recording the time for said electromagnetic energy to travel from substantially said upper and bottom surfaces, respectively, of said permafrost zone as well as from said discontinuities in said nonporous zone so as to provide a map which delineates the locations, depthwise, of said interfaces and said discontinuities within said permafrost and nonporous zones, respectively, e. interpreting the resulting record based on the difference in arrival times of reflection signals indicative of at least the location of the bottom of the permafrost zone and of the later arriving reflection signals of less magnitude, so as to indicate the locations of interfaces within the nonporous, nonfrozen zone beneath the permafrost zone favorable to the accumulation of hydrocarbons thereabout.

2. The method in accordance with claim 1 in which said zone of nonporous, nonfrozen material is entrained with hydrocarbons to the extent that the resulting dielectric constant of said nonporous zone is at least 2.17 normalized to a room temperaature of 25° C and to a measuring frequency of about $300 \times 10^6$ Hertz.

* * * * *